United States Patent [19]

Desjardins

[11] Patent Number: 5,042,967
[45] Date of Patent: Aug. 27, 1991

[54] DRIVE SHAFT AND ROTOR HUB FOR HELICOPTER FLEXIBLE ROTOR SYSTEM

[75] Inventor: Rene A. Desjardins, Media, Pa.

[73] Assignee: The Boeing Company, Seattle, Wash.

[21] Appl. No.: 397,913

[22] Filed: Aug. 24, 1989

Related U.S. Application Data

[62] Division of Ser. No. 913,274, Sep. 30, 1986, Pat. No. 4,877,375.

[51] Int. Cl.⁵ ............................................. B64C 27/33
[52] U.S. Cl. .................................. 416/134 A; 416/135
[58] Field of Search .................. 416/102, 134 A, 135, 416/138, 140, 141, 148, 103, 106

[56] References Cited

U.S. PATENT DOCUMENTS

| | | | |
|---|---|---|---|
| 2,961,051 | 11/1960 | Wilford et al. | 416/102 |
| 3,080,002 | 3/1963 | Du Pont | 416/102 |
| 3,082,826 | 3/1963 | Doman et al. | 416/102 |
| 3,087,690 | 4/1963 | Doman et al. | 416/102 |
| 4,156,583 | 5/1979 | Mayerjak | 416/244 |
| 4,251,187 | 2/1981 | Hollrock | 416/141 |
| 4,708,591 | 11/1987 | Roman | 416/134 A |
| 4,877,375 | 10/1989 | Desjardins | 416/134 A |

OTHER PUBLICATIONS

A Torsionally Stiff-Bending Soft Drive Shaft, Hannibal & Avila, Jan. 1984.
Progress in the Development of Elastomeric Matrix Composites, McGuire, Hannibal & Blenner, Jun. 1985.

*Primary Examiner*—John T. Kwon
*Attorney, Agent, or Firm*—Jones, Tullar & Cooper

[57] ABSTRACT

A rotor system according to this invention includes a structurally flexible coupling for transmitting rotor torque and other rotor loads to a rotor hub. The rotor hub is adapted to have rotor blades mounted thereon and is mounted by an elastomeric spherical bearing whose center is located at the rotor center. A flexible coupling made from fiber reinforced resin matrix material, connected to the bearing at a connection located below the bearing center, extends vertically from that location through the bearing to a position located above the center where it is connected to a connecting member fixed to the rotor hub. The flexible coupling is structurally stiff with respect to the mode in which it transmits rotor torque compared to the rotor torque stiffness of the other components. However, the bending stiffness and axial stiffness of the flexible coupling is substantially less compared to the mode in which rotor moments and forces are transmitted from the other components to the rotor shaft.

11 Claims, 4 Drawing Sheets

RATIO ($E_z/G_{\theta z}$) OF S-GLASS COMPOSITES FOR SEVERAL VALUES OF MATRIX MODULUS ($V_f$ = 50%).

DRIVE SHAFT AND ROTOR HUB FOR HELICOPTER FLEXIBLE ROTOR SYSTEM

CROSS REFERENCE TO RELATED APPLICATION

This application is a division of application, Ser. No. 06/913,274, filed 09-30-86, now U.S. Pat. No. 4,877,375.

BACKGROUND OF THE INVENTION

1. Field of the Invention

The present invention relates to the rotor hub, rotor blades, drive shaft and controls for a helicoptor rotor by means of which the aircraft is supported aerodynamically, controlled for flight maneuvers and connected to the drive system.

This invention is particularly suited for use with helicopter rotor systems wherein conventional, rigid mechanical bearings, by which the dynamic rotor components are usually interconnected, are replaced by flexible, elastomeric bearings that provide resilient, dimensionally variable interconnections among the various components.

2. Description of the Prior Art

A helicopter rotor includes a rotor hub driveably connected on the end of a rotor shaft, which transmits power through a transmission from the engines. Rotor blades are mounted on the hub, spaced angularly from one another and extending radially outward from the axis of the hub. The rotor blades are formed with an airfoil contoured surface so that aerodynamic lift forces are produced as the blades rotate through the atmospheric air. The lift force and a vertically directed component of the centrifugal forces of the rotor blades operate to support the aircraft and horizontal or forward directed components of the aerodynamic lift and centrifugal forces operate to accelerate and manuever the aircraft. The magnitude of the lift force varies as a function of the velocity of the rotor blades relative to the ambient air and the angle of attack or pitch angle of the blades relative to the airstream.

For a particular blade pitch angle, the lift developed by a rotor blade is greater as it advances due to rotation toward the airstream created by the forward speed of the aircraft than the lift developed as the blade retreats due to rotation from the airstream. The velocity of the airstream relative to the advancing blade is greater than its velocity relative to the retreating blade because the speed due to rotation adds to this speed due to forward flight, but as to the retreating blade, these speeds are opposed. To accommodate the speed difference and to maintain the lift force more nearly equal on the blades around the entire rotational path, the rotor controls increase the pitch angle on the portion of the rotor where the speeds are subtractive and decrease the pitch angle where the speeds are additive.

In conventional rotor systems the pitch angle change is made by pitch links fixed at one end to a gimballed pitch ring, which is tilted with respect to the rotor hub, and fixed at the opposite end to a pitch arm, which is connected to the root of the rotor blade eccentric of the blade pitch axis. The blade pivots about the pitch axis in accordance with the tilt of the pitch ring because the blade is pivotably connected to the hub by a torsionally flexible tension-torsion pack through which the centrifugal force is carried rigidly to the hub.

The rotor blades also flap about horizontal axes located at the blade root so that bending moments about the flap axis are controlled to an acceptable magnitude. The flapwise pivoting conventionally occurs by mounting the blade on bearings supported on a horizontal pin carried on the rotor hub. This pinned connection, located at a predetermined distance from the rotor center, assures that the flapwise moment at the connection is zero and establishes the magnitude of the rotor moment at the rotor center as the product of the perpendicular force on the rotor arm times the distance from the rotor center to the flapwise pinned connection.

The rotor blades also pivot about a vertical axis located a predetermined radial distance from the rotor center. In conventional rotor systems a damper is connected across this to tune the rotor system against latent instabilities that can arise due to starting the rotor while the helicopter is elastically supported on ground wheel oleos, a condition called ground resonance. The presence of the vertical or lead-lag axis assures that the moment at the connection and at the rotor center is controlled to an acceptable magnitude.

Recently, more advanced rotor systems have substituted structural flexibility for the mechanical pinned rotor blade connections at its root end attachments to the rotor hub about the flapwise axis, the lead-lag axis and the pitch axis, while maintaining the rigid force continuity essential to proper operation. For example, instead of the horizontal bearing connection the rotor blade has been formed with a member, located near the rotor, having relatively low flapwise bending stiffness and high axial or spanwise tension stiffness. This member, called a flexure carries all of the blade loads to the rotor yet it permits the blade to pitch, flap and lead-lag without providing bearing connections to the rotor hub to control the magnitude of the rotor moment.

In rotors of this kind, the flexure is made from fibers such as fiber glass, Kevlar, graphite, Boron, etc. supported and connected by polymeric resin matrices of materials such as epoxy, phenolic, polyesters, etc. However, although the flexure is flexible with respect to flapwise bending, edgewise bending and torsion, it must have adequate strength to transmit flapwise bending moments, edgewise or lead-lag bending moments, blade pitch or torsion moments and centrifugal force from the blade to the rotor hub.

Furthermore, the flexure cannot duplicate entirely the effect of the conventional pinned connections of the rotor blade to the rotor hub because of the structural continuity that must be maintained. Therefore, the flapwise bending moment in particular is larger than if a flapwise pinned connection were used. Accordingly, the rotor hub moments are generally higher for the advanced rotor hub systems that employ structural rotor blade flexibility as a means to simulate the effect of conventional pinned rotor blade support on the rotor hub.

When the rotor blade root end bending moments are large the rotor moment is large and requires additional control force to adjust the attitude of the helicopter rotor with respect to the attitude required for a maneuver or flight speed change.

A rotor system of the flexural type is described in the paper entitled "Flexible Matrix Composite Applied to Bearingless Rotor Systems", by A. J. Hannibal et al, presented at the American Helicopter Society Composite Structures Specialists Meeting in Philadelphia, Pa., March 1983. U.S. Pat. Nos. 3,669,566 and 4,332,525 describe helicopter rotor systems that employ composite materials.

SUMMARY OF THE INVENTION

To overcome the difficulties associate with large rotor moments, which arise with structurally flexible, bearingless rotor blades, a rotor system according to this invention includes a structurally flexible rotor shaft for transmitting rotor torque and other rotor loads to a rotor hub. The rotor hub is adapted to have rotor blades mounted thereon and is mounted by an elastomeric spherical bearing whose center is located at the rotor center. A flexible shaft made from fiber reinforced resin matrix material is connected to the rotor shaft at a connection located below the bearing center, extends vertically from that location through the bearing to a position located above the bearing center where it is connected to a connecting member fixed to the upper surface of the rotor hub.

The flexible shaft is structurally stiff with respect to the mode in which it transmits rotor torque compared to the rotor torque stiffness of the other components. However, the bending stiffness and axial stiffness of the flexible shaft is substantially less compared to the mode in which rotor moments and forces are transmitted from the other components to the rotor shaft.

It is an object of this invention to provide a rotor system having a flexible support between the rotor shaft and rotor hub so the angular flapwise movement of the rotor occurs with little restriction external to the rotor. The elastomeric bearing and flexible shaft provide a flexible support for the rotor that permits relatively large angular movement about the center of the bearing.

It is another object of this invention to provide a relatively stiff structural load path between the rotor shaft and rotor hub for loads other than those that cause tilting of the rotor about the bearing center. The nature of the fiber orientation and the resin matrix that supports the fibers of the flexible shaft operates to produce the requisite torsional stiffness and flexible bending stiffness to realize these objects.

Description of the Preferred Embodiment

Figure 1:
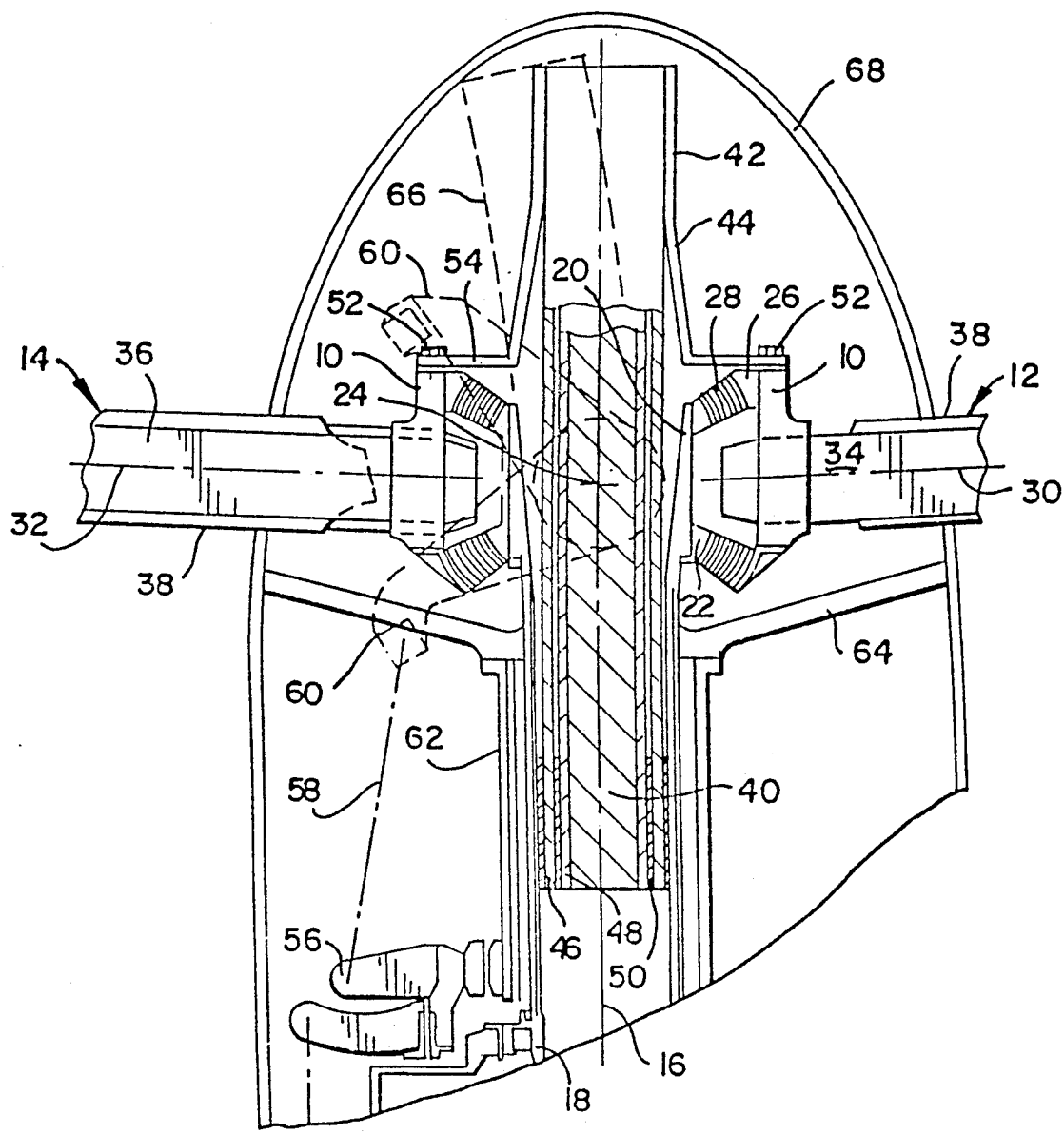
FIG. 1 is a side cross section taken at a vertical plane through the rotor center of a flexible rotor system according to this invention.

Referring first to FIG. 1, the rotor hub 10 is adapted to have rotor blades 12, 14 mounted thereon and extending radially outward from the axis 16, which is directed substantially vertical from a transmission output. A rotor shaft 18 is driveably connected to the transmission output and is connected by an extension 20 to the inner race 22 of a spherical elastomeric bearing whose center is at 24. The external race 26 is connected to hub 10. Located between the inner race and outer race is a bearing core comprising multiple laminates of elastomer alternating with and bonded to metal laminas. All of the laminas and both races as centered at 24. The bearing races are arranged in pairs located on opposite vertical sides of the blade pitch axes 30 and 32. The bearing provides a resilient connection between the races and permits rotation between the races about the entire center 24 that is unrestricted except for the shear stiffness of the elastomeric center.

The rotor blades include pitch elements 34, 36 made from fiber reinforced with matrix composite material wherein the fibers are directed predominately parallel to the pitch axes. The pitch elements are fixed to the rotor hub 10 to which the centrifugal force and other rotor blade loads are tranferred. The torsional stiffness of the pitch elements is very low compared to its axial stiffness and bending stiffnesses about the flapwise and edgewise axes because the fibers are directed parallel to the pitch axes.

Hub 10 surrounds the rotor center and is connected mechanically to the outer races 26 of the bearing. Each blade is fitted with a pitch cuff 38, a tube located over each pitch element and extending spanwise along the pitch axis from an attachment to a pitch link at its inboard end to an attachment to the blade located outboard of the outer end of the pitch element. The pitch cuff is made from fiber reinforced polymer resin wherein the fibers are biased or angularly turned with respect to the pitch axis. Because the pitch cuff should have a large torsional stiffness compared to its bending and axial stiffnesses, the fibers are preferably biased approximately 45° in both angular directions on opposite sides of the pitch axis.

A flexible shaft assembly 40 is connected to rotor shaft 18 below the rotor center, extends upward past the rotor center, and is connected at 42 to connecting member 44. The connections of the flexible shaft assembly to the rotor shaft and connecting members can be mechanical connections made by bolts directed radially through the shafts, or bonded connections made by polymerizing epoxy or another material located between the surfaces to be joined. Alternatively, the connections can be made as described in pending patent application Ser. No. 706,242, now U.S. Pat. No. 4,838,831 entitled "Coupling and Method of Connecting Two Shafts With the Coupling" by William Rumberger assigned to the assignee of the present invention.

The flexible shaft 40 can comprise an outer flexible shaft 46 and an inner flexible shaft 48 concentrically arranged and extending vertically along the same distance from the rotor shaft 18 to the connecting member 44. Concentric shafts 46 and 48 are spaced from one another radially by a layer of filler 50 which can be an epoxy bondline formed after the tubes are manufactured.

The connecting member 44 can be made from metal such as alloy steel or titanium or it can be formed of the same material as is used for the flexible shafts. In either case connections are made at 52 between the upper surface of the rotor hub and the radial flange 54 of member 44.

The lower rotor controls 56 include a link 58 connected to a pitch arm 60 that extends outward from a connection to the rotor hub and centered at 24. As pitch arm 60 is moved between the positions shown in FIG. 1 the attitude of the rotor hub can be altered in relation to the fuselage. In this way the direction of the rotor lift is changed in accordance with manual control input by the pilot as required for flight maneuvers and forward speed flight. The slider guide 62, mounted slidable on and coaxially with the rotor shaft, is connected at its upper end to a pitch ring 64 on which the lower end of the pitch links (not shown) are connected. As the slider is moved by the lower controls upward and downward the pitch links transfer that motion to the rotor blade through the pitch cuff to vary the blade pitch angle. A cover 68 encapsulates the rotor.

The rotor is gimballed by the bearing about rotor center 24 and connected to the rotor shaft. The rotor and blades rotate about center 24 and transfer the rotor moment from rotor shaft 18 through the bearing to a rotor hub 10. The hub moment causes the rotor to tilt around center 24 and flexible shaft assembly 40 bends with relatively little resistance about a bending axis perpendicular to its longitudinal axis to the deflected position shown at 66. The flexible shafts offer little bending resistance in comparison to the stiffness of the load path from rotor shaft 18 to rotor hub 10 through the bearing. Similarly, flexible shaft assembly 40 offers little resistance to force directed along its axis compared to the stiffness of the load path from rotor hub 10, and the bearing to rotor shaft 18. However, the torsional stiffness of the flexible shaft assembly is large relative to the torsional stiffness of the load path from rotor shaft 18 to rotor hub 10 through the bearing. Accordingly, substantially all the rotor torque carried by rotor shaft 18 from the transmission output is transferred to the flexible shaft assembly 40 at the connection located below the rotor center 24. The rotor torque is then transferred from flexible shaft assembly 40 to the connecting member 44 at connection 42 and then is transferred to rotor hub 10 at the mechanical connection 52.

To provide the torsionally stiff and flexurally soft structural characteristics, the flexible shafts are formed from S-glass or E-glass fibers reinforced with flexible urethane polymers such as MXU-34, MXU-17, MXU-10 or commercial urethane polymers #1 and #2 available from Lord Corporation, 1635 West 12th Street, Erie, Pa. 16512. These materials and the configuration of the fibers were discussed in the technical papers entitled "Progress in the Development of Elastomeric Matrix Composites", by D. P. McGuire et al, presented at the American Helicopter Society Composites Manufacturing Specialists Meeting, Stanford, Conn., June 1985 and the technical paper by A. J. Hannibal et al. previously cited. The entire disclosure of these technical papers is incorporated herein by reference.

Figures 2A, 2B:
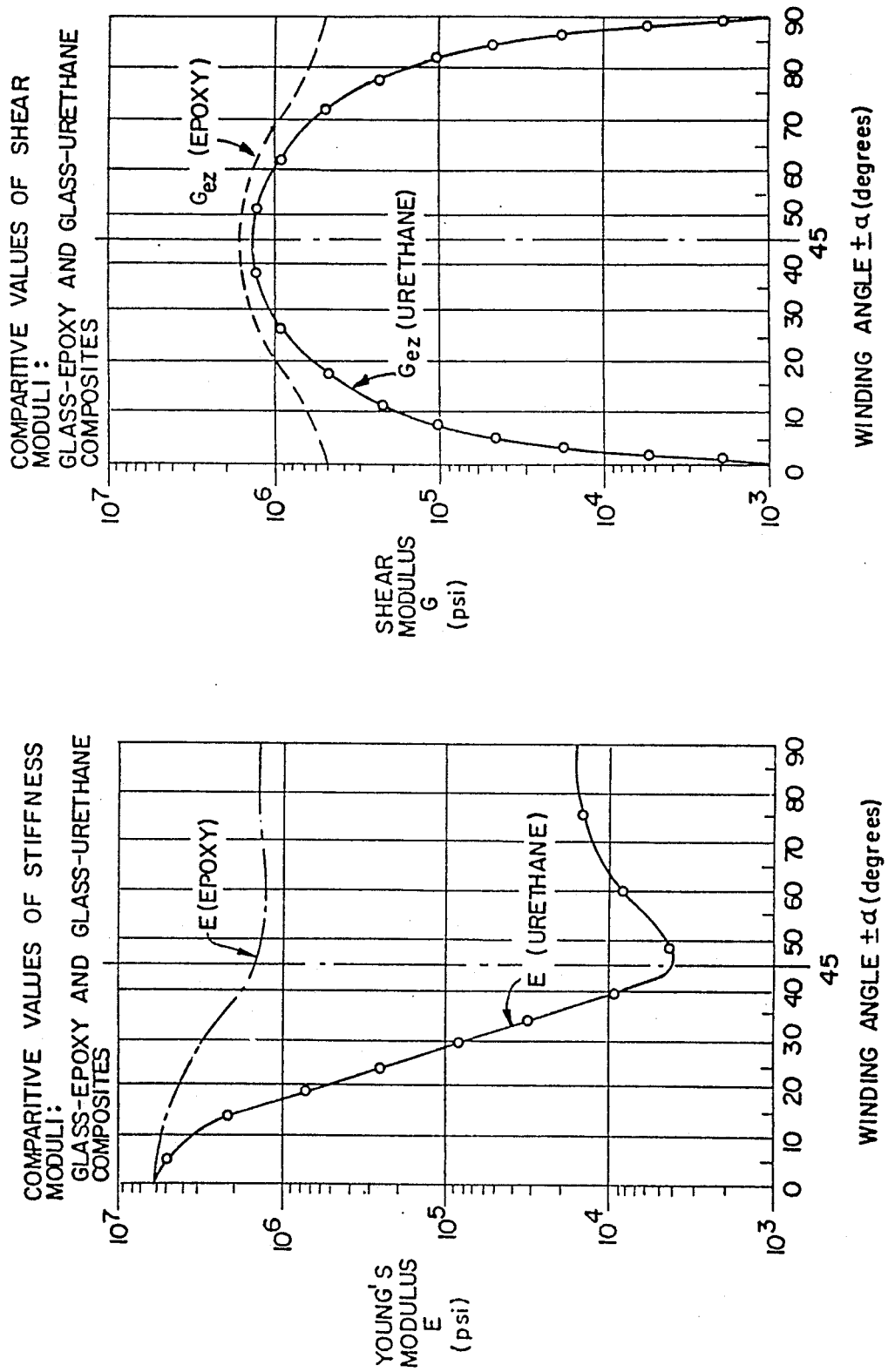
FIGS. 2A and 2B are graphs that show the variations of Young's Modulus and shear modulus with winding angle for epoxy and urethane resin materials supporting E fiber glass material.
Figure 2C:
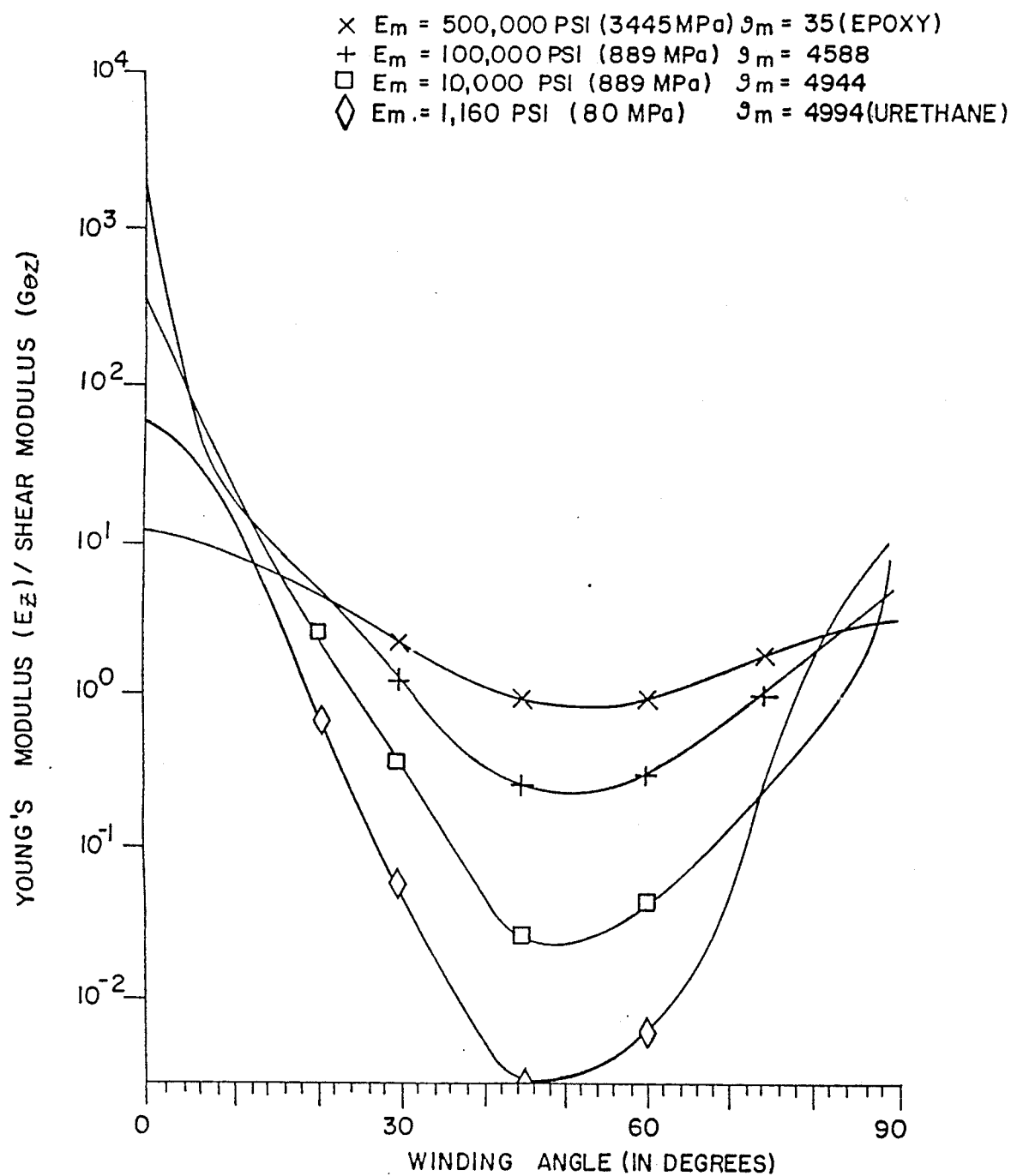
FIG. 2C shows the variation of the ratio of Young's modulus to shear modulus with winding angle for epoxy and urethane resin matrices supporting S fiber glass material.

FIG. 2A shows that Young's Modulus for E-glass fibers supported by a matrix of urethane polymer is substantially lower than for epoxy polymer and that the lowest Young's Modulus occurs when the fibers are directed at 45° on both sides of the longitudinal axis of the tube. FIG. 2B shows that the shear modulus, which is a measure of the torsional stiffness of the tube, is a maximum when the fiber bias angle with respect to the tube axis is 45° and that urethane matrix material have only slightly lower shear modulus than epoxy matrix materials. FIG. 2C shows that the ratio of Young's Modulus to Shear modulus can vary according to fiber direction from 0.001 to 10,000 for urethane matrix materials compared to a range of 0.50 to 30 for epoxy materials.

Preferably the shafts 46 and 48 that comprise the flexible shaft assembly 40 and the connecting member 44 are formed from urethane based matrix material supporting fibers of S-glass, E-glass, graphite or Kevlar and the fibers are turned angularly 45° with respect to the axis of shafts 46 and 48 and member 44.

Figure 3:
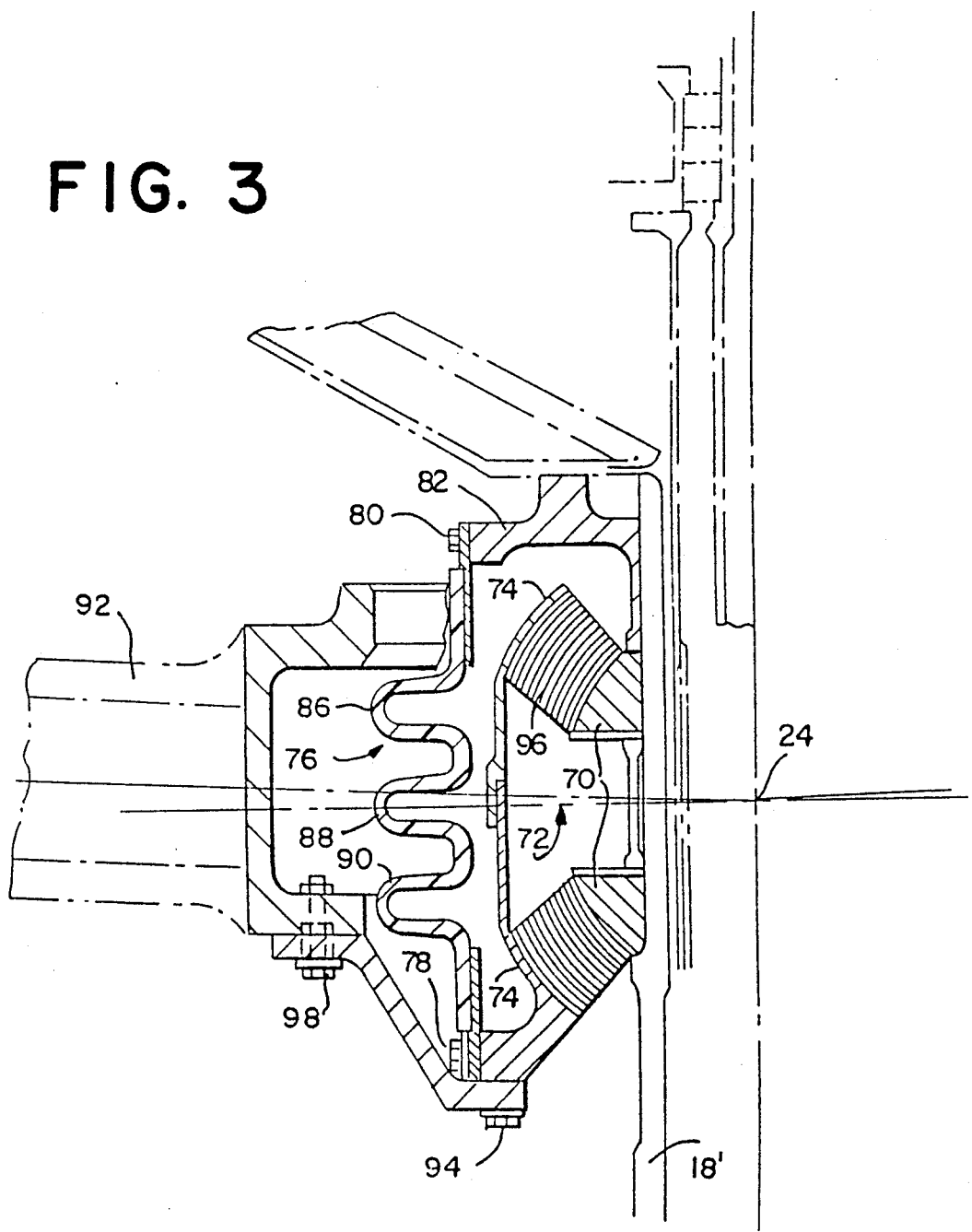
FIG. 3 is a side cross section taken at a vertical plane through the rotor center of a flexible rotor system in which a flexible matrix diaphragm coupling is used.

Referring now to FIG. 3, the rotor shaft 18' is connected to the inner race 70 of a bearing 72 having a center at 24. The outer race 74 of the bearing is connected to a torsionally rigid coupling 76, which surrounds bearing 72 and makes a stiff torsional connection between its connection at 78 to the outer bearing race and its connection at 80 to the drive plate 82.

Figure 4A:
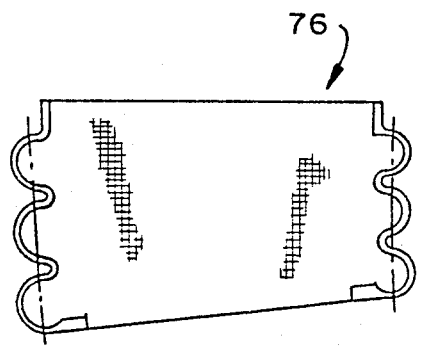
FIGS. 4A and 4B show the flexible matrix diaphragm coupling in deflected positions.
Figure 4B:
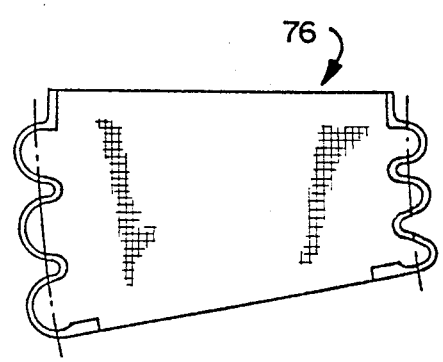

The coupling is made also from urethane matrix material, preferably MUX-34, MUX-17, or MUX-19 and S-glass, E-glass, Kevlar or graphite fibers directed at a 45° degree bias relative to the axis of rotor shaft 18'. The folds 86, 88, 90 facilitate movement of the coupling to positions, such as those of FIG. 4A and 4B, that accommodate movement of the rotor hub and rotor blades about center 24 with respect to rotor shaft 18'.

In this embodiment the rotor blades are fixed to the outer ends of pitch arms 92, which are bolted to the outer race of the bearing for gimballed movement about center 24. Drive plate 82 maintains its horizontal position as the rotor pivots, but attachment 78, outer race 74 and the attachement 94, where the pitch spindle is connected to the outer race, pivot about center 24. The rotor shaft is therefore, separated from the movement of the outer bearing race and the components connected to it by the cone 96 of the bearing, which is made from elastomer and metal laminas having spherical surfaces centered at 24. The deflection of the outer race relative to the inner race causes shear strain in the elastomeric bearing cone.

Rotor torque is carried from the transmission output by rotor shaft 18' to drive plate 82 from which it is transferred by attachment 80 to coupling 76. The stiff torsional resistance of the coupling transmits rotor torque to the pitch spindle adjacent attachment and at attachments 94 and 98.

What is claimed is:

1. A rotor for supporting helicopter rotor blades that extend radially outward from the rotor comprising:
   a rotor shaft driveably connecting the rotor to a power source, mounted for rotation about a central longitudinal axis;
   flexible bearing means mounted on the rotor shaft, having an outer race and defining a center about which the outer race pivots;
   flexible coupling means comprising composite material of fibers reinforced with a resin matrix, and having a first end fixed to the rotor shaft and a second end connected to the outer bearing race for flexibly connecting the rotor shaft to the outer bearing race for pivotal movement about the center and for inflexibly connecting the rotor shaft to the outer bearing race for torsional movement; and
   means connected to the second end of the flexible coupling means for mounting a rotor blade to the rotor, wherein the load path by which rotor torque is transmitted between the rotor shaft and mounting means through the coupling means is flexible in relation to the load path by which torque is transmitted from the rotor shaft through the flexible coupling means.

2. The rotor of claim 1 wherein the bearing means comprises:
   an inner race driveably connected to the rotor shaft defining a spherical surface;

an outer race driveably connected to the coupling means defining a spherical surface concentric with the spherical surface of the inner race; and flexible cone means located between the inner race and outer race for resiliently connecting the inner and outer races for movement about said center.

3. The rotor of claim 2 wherein the bearing means comprises multiple pairs of inner and outer races one pair located on laterally opposite sides of the plane that is perpendicular to the axis of the rotor shaft and passes through the bearing center.

4. The rotor of claim 1 wherein the flexible coupling means is made from fiber material directed substantially at a forty-five degree angle on opposite sides of and with respect to the axis of the flexible coupling means and the fibers are supported by a matrix of polymeric urethane resin.

5. The rotor of claim 4 wherein the resin is made from a urethane polymer from the group consisting of MXU-34, MXU-17, and MXU-10.

6. The rotor of claim 5 wherein the fiber material is from the group consisting of S fiber glass or E fiber glass.

7. The rotor of claim 1 wherein the flexible coupling means is made from fiber material whose fibers are directed substantially angularly biased with respect to the axis of the flexible coupling means and the fibers are supported by a matrix of polymeric resin.

8. The rotor of claim 7 wherein the fibers are supported by resin made from urethane.

9. The rotor of claim 1 wherein the flexible coupling means is made from fiber material supported by a matrix of polymeric urethane-based resin, the composite material formed of said fiber material and said resin having a ratio of Young's modulus to shear modulus that is variable over the range from 0.001 to 10,000 in accordance with the angular direction of the fibers with respect to the axis of an applied axial force and a shear load.

10. The rotor of claim 1 wherein the torsional stiffness of the flexible coupling means about its axis is large compared to its bending stiffness about an axis perpendicualr to its longitudinal axis.

11. The rotor of claim 1 wherein the torsional stiffness of the flexible coupling means about its axis is large compared to its bending stiffness about an axis perpendicualr to its longitudinal axis and compared to its axial stiffness.

* * * * *